US011484028B2

(12) United States Patent
Yee et al.

(10) Patent No.: US 11,484,028 B2
(45) Date of Patent: Nov. 1, 2022

(54) FABRICATION OF NANO-STRUCTURES ON MULTIPLE SIDES OF A NON-PLANAR SURFACE

(71) Applicant: The Regents of The University of California, Oakland, CA (US)

(72) Inventors: Albert Yee, Irvine, CA (US); Susan Christine Wu, Costa Mesa, CA (US); Mary Nora Dickson, Costa Mesa, CA (US); Elena Liang, Irvine, CA (US)

(73) Assignee: The Regents of The University of California, Oakland, CA (US)

( * ) Notice: Subject to any disclaimer, the term of this patent is extended or adjusted under 35 U.S.C. 154(b) by 259 days.

(21) Appl. No.: 16/083,718

(22) PCT Filed: Mar. 10, 2017

(86) PCT No.: PCT/US2017/021926
§ 371 (c)(1),
(2) Date: Sep. 10, 2018

(87) PCT Pub. No.: WO2017/160658
PCT Pub. Date: Sep. 21, 2017

(65) Prior Publication Data
US 2019/0075789 A1  Mar. 14, 2019

Related U.S. Application Data

(60) Provisional application No. 62/308,118, filed on Mar. 14, 2016.

(51) Int. Cl.
*B29C 59/02* (2006.01)
*B82Y 40/00* (2011.01)
*A01N 25/34* (2006.01)

(52) U.S. Cl.
CPC ............ *A01N 25/34* (2013.01); *B29C 59/021* (2013.01); *B29C 59/022* (2013.01); *B29C 59/026* (2013.01); *B82Y 40/00* (2013.01); *B29C 2059/023* (2013.01)

(58) Field of Classification Search
CPC .... A01N 25/34; B29C 59/021; B29C 59/022; B29C 59/026; B29C 2059/023; B82Y 40/00
See application file for complete search history.

(56) References Cited

U.S. PATENT DOCUMENTS

| | | | |
|---|---|---|---|
| 6,106,552 | A | 8/2000 | Lacombe et al. |
| 7,229,685 | B2 | 6/2007 | Full et al. |
| 10,828,394 | B2 | 11/2020 | Yee et al. |
| 10,875,235 | B2 | 12/2020 | Yee et al. |
| 11,086,049 | B2 | 8/2021 | Yee et al. |
| 11,284,991 | B2 | 3/2022 | Yee et al. |
| 2003/0175325 | A1 | 9/2003 | Chatelier et al. |
| 2007/0168025 | A1 | 7/2007 | Darougar et al. |
| 2007/0227428 | A1 | 10/2007 | Brennan et al. |
| 2008/0317982 | A1 | 12/2008 | Hecht et al. |
| 2009/0194913 | A1* | 8/2009 | Chang ................ B29C 35/0805 264/447 |
| 2009/0266418 | A1 | 10/2009 | Hu et al. |
| 2010/0036488 | A1 | 2/2010 | de Juan, Jr. et al. |
| 2010/0239637 | A1 | 9/2010 | Ciolino et al. |
| 2011/0125260 | A1 | 5/2011 | Shen |
| 2011/0135814 | A1 | 6/2011 | Miyauchi et al. |
| 2011/0160851 | A1 | 6/2011 | Mueller-lierheim |
| 2011/0208300 | A1 | 8/2011 | De Juan, Jr. et al. |
| 2013/0059113 | A1 | 3/2013 | Hatton et al. |
| 2013/0244889 | A1 | 9/2013 | Yim et al. |
| 2014/0305904 | A1 | 10/2014 | Lan |
| 2015/0104522 | A1 | 4/2015 | Xu |
| 2015/0104622 | A1 | 4/2015 | Chong et al. |
| 2015/0273755 | A1 | 10/2015 | Yee et al. |
| 2019/0076573 | A1 | 3/2019 | Yee et al. |
| 2019/0101669 | A1 | 4/2019 | Yee et al. |
| 2020/0163753 | A1 | 5/2020 | Yee et al. |
| 2022/0096373 | A1 | 3/2022 | Yee et al. |

FOREIGN PATENT DOCUMENTS

| | | |
|---|---|---|
| WO | 2013172794 A1 | 11/2013 |
| WO | 2015055656 A1 | 4/2015 |
| WO | 2017156460 A1 | 9/2017 |

(Continued)

OTHER PUBLICATIONS

International Preliminary Report on Patentability for International Application PCT/US2017/021908, Report dated Sep. 11, 2018, dated Sep. 20, 2018, 9 Pgs.
International Preliminary Report on Patentability for International Application PCT/US2017/021926, Report dated Sep. 18, 2018, dated Sep. 27, 2018, 7 Pgs.
International Search Report and Written Opinion for International Application No. PCT/US2017/021908, Search completed Jun. 23, 2017, dated Jul. 7, 2017, 12 Pgs.
International Search Report and Written Opinion for International Application No. PCT/US2017/021926, Search completed Apr. 25, 2017, dated Jun. 1, 2017, 8 Pgs.
Banerjee et al., "Antifouling Coatings: Recent Developments in the Design of Surfaces That Prevent Fouling by Proteins, Bacteria, and Marine Organisms.", Advanced Materials, Feb. 11, 2011, vol. 23 Issue 6, pp. 690-718.
Chung et al., "Impact of engineered surface microtopography on biofilm formation of *Staphylococcus aureus*", Biointerphases, Jun. 2007, vol. 2, Issue 2, pp. 89-94.

(Continued)

*Primary Examiner* — Hasan S Ahmed
(74) *Attorney, Agent, or Firm* — KPPB LLP

(57) ABSTRACT

In various embodiments, disclosed herein is a device comprising a non-planar surface, wherein nanostructures are fabricated on the non-planar surface. Also provided herein are methods of making and using a device comprising a non-planar surface, wherein nanostructures are fabricated on the non-planar surface. Further provided herein are methods of using a device comprising one or more non-planar surfaces, wherein the non-planar surfaces comprise one or more microstructures or nanostructures, comprising the steps: (a) using the device for its ordinary purpose; and (b) wherein the microstructures or nanostructures present in the device prevent proliferation of bacteria.

9 Claims, 2 Drawing Sheets

(56) References Cited

FOREIGN PATENT DOCUMENTS

WO     2017160658 A1    9/2017
WO     2017156460 A8    5/2018

OTHER PUBLICATIONS

Hasan et al., "Selective bactericidal activity of nanopatterned superhydrophobic cicada *Psaltoda claripennis* wing surfaces", Appl Microbiol Biotechnol, 2013, vol. 97, pp. 9257-9262.

Ivanova et al., "Natural Bactericidal Surfaces: Mechanical Rupture of Pseudomonas aeruginosa Cells by Cicada Wings", Small, Aug. 20, 2012, vol. 8, Issue16, pp. 2489-2494.

Kirschner et al., "Bio-Inspired Antifouling Strategies, Annual Review of Materials Research", 2012, vol. 42, pp. 211-229.

Kopplmayr et al., "Nanoimprint Lithography on curved surfaces prepared by fused deposition modelling", Surface Topography: Metrology and Properties. Jun. 2015, vol. 3, No. 2, 024003, 12 pgs.

Liu et al., "Bio-Inspired Design of Multiscale Structures For Function Integration, Nano Today", Apr. 2011, vol. 6 issue 2, pp. 155-175.

Pogodin et al., "Biophysical Model of Bacterial Cell Interactions with Nanopatterned Cicada Wing Surfaces", Biophysical Journal vol. 104, Issue 4, 2013 pp. 835-840.

Sun et al., "Wetting properties on nanostructured surfaces of cicada wings", The Journal of Experimental Biology Oct. 1, 2009, vol. 212, Issue 19, pp. 3148-3155.

Yao et al., "Atomic Force Microscopy and Theoretical Considerations of Surface Properties and Turgor Pressures of Bacteria", Colloids and Surfaces B: Biointerfaces 2002, vol. 23, pp. 213-230.

Zhang et al., "Cicada Wings: A Stamp from Nature for Nanoimprint Lithography", Small Dec. 2006, vol. 2 Issue 12, pp. 1440-1443.

Zhang et al., "Surface Modification of Polymethyl Methacrylate Intraocular Lenses by Plasma for Improvement of Antithrombogenicity And Transmittance", Applied Surface Science, vol. 255, pp. 6840-6845, Year (2009).

Deodhar et al., "Conserved Activity of Reassociated Homotetrameric Protein Subunits Released from Mesoporous Silica Nanoparticles", Langmuir, 2018, Published Dec. 12, 2017, vol. 34, pp. 228-233, doi: 10.1021/acs.langmuir.7b03310.

Farrand et al., "Prevalence of Diagnosed Dry Eye Disease in the United States Among Adults Aged 18 Years and Older", American Journal of Ophthalmology, Jun. 30, 2017, vol. 182, pp. 90-98, doi: 10.1016/j.ajo.2017.06.033.

Gause et al., "Mechanistic modeling of ophthalmic drug delivery to the anterior chamber by eye drops and contact lenses", Advances in Colloid and Interface Science, 2016, Available Online Aug. 14, 2015, vol. 233, pp. 139-154; doi: 10.1016/j.cis.2015.08.002.

Tang et al., "Mesoporous Silica Nanoparticles: Synthesis, Biocompatibility and Drug Delivery", Advanced Materials, Feb. 29, 2012, vol. 24, No. 12, pp. 1504-1534, doi: 10.1002/adma.201104763.

Huang et al., "Dendritic Mesoporous Silica Nanospheres Synthesized by a Novel Dual-Templating Micelle System for the Preparation of Functional Nanomaterials", Langmuir, Jan. 17, 2017, vol. 33, No. 2, pp. 519-526, doi: 10.1021/acs.langmuir.6b03282, Epub Dec. 19, 2016.

Lira et al., "Changes in UV-Visible Transmittance of Silicone-Hydrogel Contact Lenses Induced by Wear", Optometry and Vision Science, Apr. 2009, vol. 86, No. 4, pp. 332-339, doi: 10.1097/OPX. Ob013e318198d047.

\* cited by examiner

FABRICATION OF NANO-STRUCTURES ON MULTIPLE SIDES OF A NON-PLANAR SURFACE

CROSS REFERENCE TO RELATED APPLICATIONS

This application is a National Phase of International Application No. PCT/US2017/021926, filed Mar. 10, 2017, which designated the U.S. and that International Application was published under PCT Article 21(2) in English. This application also includes a claim of priority under 35 U.S.C. § 119(e) to U.S. Provisional Application No. 62/308,118, filed Mar. 14, 2016, the entirety of which is hereby incorporated by reference.

FIELD OF THE INVENTION

The present disclosure is in the medical and biomedical field, specifically medical devices.

BACKGROUND OF THE DISCLOSURE

Current literature provides some examples of transferring micro- and nano-structures to planar and curved surfaces. In one example, nano-structures were made on a pre-stretched flat surface. However, when the stretch was released, the film returned to the initial, non-planar shape. In another example, nano-structures were transferred on to a surface using soft lithography; however, this method was limited because it only applied to a limited range of elastomeric materials.

In each of these existing technologies, only one side of the device displayed the micro- or nano-structures. Existing technologies are not geared towards devices where micro- or nano-structures are present on multiple sides of the device. Moreover, existing technologies are not geared towards devices where the micro- or nano-structures cover all the exposed areas of the device. Finally, current technology does not enable applying nano-structures to a diverse range of materials, biomedical devices, and macro-scale non-planar surface topographies.

Thus, there remains a need in the art for devices that enable applying micro- or nano-structures to a diverse range of materials, biomedical devices, and macro-scale non-planar surface topographies, and where the micro- or nano-structures are present on multiple sides of the device.

SUMMARY OF THE DISCLOSURE

In various embodiments, disclosed herein is a device, comprising a non-planar surface, wherein nanostructures are fabricated on more than one side of the non-planar surface. In one embodiment, the device is a medical and/or biomedical device. In one embodiment, the biomedical device comprise artificial cornea, catheter, or stent. In one embodiment, the device is an ophthalmic device comprising a lens. In one embodiment, the lens has a curved surface, and wherein the curved surface comprise nanostructures. In one embodiment, the nanostructures comprise nanopillars. In one embodiment, the nanopillars increase or decrease the motility of cells on the device. In one embodiment, the nanopillars prevents proliferation of a microorganism. In one embodiment, the microorganism is a bacterium.

In various embodiments, disclosed herein is a method of transferring a microstructured or nanostructured polymer thin film to a curved surface, comprising: providing an elastomeric negative mold with microcavities or nanocavities, wherein the microcavities or nanocavities are the negative of the desired structures; spin-casting a polymer solution onto the elastomeric negative mold, which causes infiltration of the microcavities or nanocavities and creates a microstructured or nanostructured polymer thin film on the elastomer surface; and transferring the microstructured or nanostructured polymer thin film to the curved surface under heat and pressure. In one embodiment, the curved surface is a component of a medical and/or biomedical device. In one embodiment, the biomedical device comprises artificial cornea, catheter, or stent. In one embodiment, the medical device is an ophthalmic device comprising a lens. In one embodiment, the microstructures or nanostructures comprise micropillars or nanopillars. In one embodiment, the micropillars or nanopillars increase or decrease the motility of cells on contact with the curved surface. In one embodiment, the micropillars or nanopillars prevents proliferation of a microorganism. In one embodiment, the microorganism is a bacterium. In one embodiment, the curved surface is a curved polymer surface.

In various embodiments, disclosed herein is a method of using a device comprising one or more non-planar surfaces, wherein the non-planar surfaces comprise one or more microstructures or nanostructures, comprising the steps: (a) using the device for its ordinary purpose; and (b) wherein the microstructures or nanostructures present in the device prevent proliferation of bacteria. In one embodiment, the device is a medical device. In one embodiment, the device is a touch device. In one embodiment, the touch device is an electronic device with a touch surface, a writing pen, hospital bed, door knob, light switch, kitchen surface, bathroom surface, or children's toy.

Other features and advantages of the invention will become apparent from the following detailed description, taken in conjunction with the accompanying drawings, which illustrate, by way of example, various embodiments of the invention.

DESCRIPTION OF THE DRAWINGS

Exemplary embodiments are illustrated in referenced figures. It is intended that the embodiments and figures disclosed herein are to be considered illustrative rather than restrictive.

DETAILED DESCRIPTION

Figure 1:
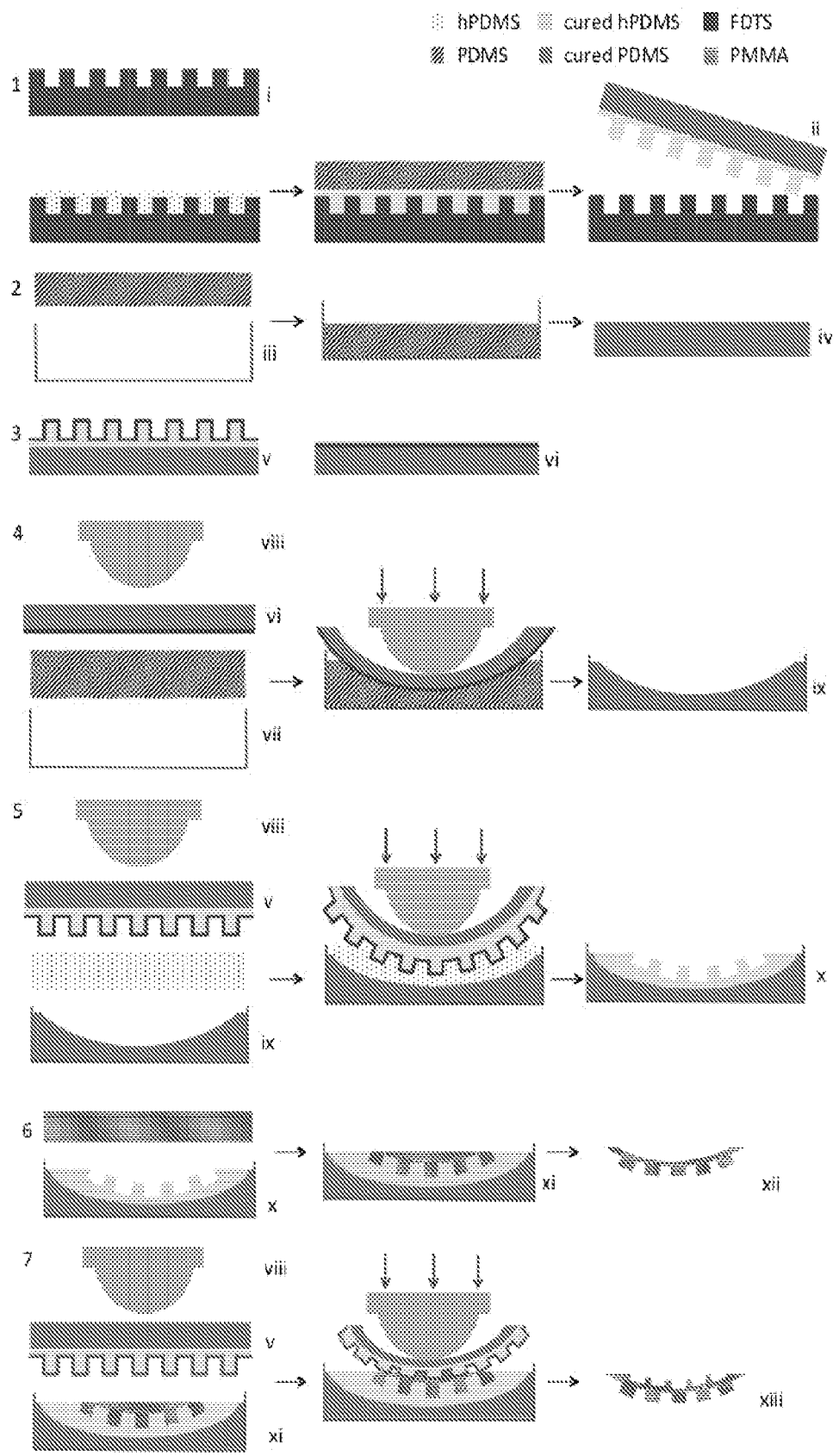
FIG. 1 illustrates, in accordance with embodiments herein, a process of making a curved nanostructured polymer surface.

All references, publications, and patents cited herein are incorporated by reference in their entirety as though they are fully set forth. Unless defined otherwise, technical and scientific terms used herein have the same meaning as commonly understood by one of ordinary skill in the art to which this invention belongs. Hornyak, et al., Introduction to Nanoscience and Nanotechnology, CRC Press (2008); Singleton et al., Dictionary of Microbiology and Molecular Biology 3rd ed., J. Wiley & Sons (New York, N.Y. 2001); March, Advanced Organic Chemistry Reactions, Mechanisms and Structure 7th ed., J. Wiley & Sons (New York, N.Y. 2013); and Sambrook and Russel, Molecular Cloning: A Laboratory Manual 4th ed., Cold Spring Harbor Laboratory Press (Cold Spring Harbor, N.Y. 2012), provide one skilled in the art with a general guide to many of the terms used in the present application. One skilled in the art will recognize many methods and materials similar or equivalent to those described herein, which could be used in the practice of the present invention. Indeed, the present invention is in no way limited to the methods and materials described.

The term "nanostructure(s)," as used herein, refers to structures which have a size between molecular and microscopic structures. Typically, such structures have at least one dimension on the nanoscale, e.g., between about 1 nm and about 999 nm. The nanostructures can be configured so as to include one or more of the following: (1) a nano surface having one dimension on the nanoscale, for example, a surface thickness between 1 nm and 999 nm; (2) a nanopillar or nanotube having two dimensions on the nanoscale, for example, a diameter and length each between 1 nm and 999 nm; and/or (3) a nanoparticle having three dimensions on the nanoscale, for example, the three spatial dimensions of the nanoparticle being between 1 nm and 999 nm. In one embodiment, the term nanopillar further refers to vertically oriented elongate structures, which may be straight, winding, zigzag, or crooked.

The term "microstructure(s)," as used herein, refers to structures which have at least one dimension on the microscale, e.g., between about 1 μm and about 999 μm. The microstructures can be configured so as to include one or more of the following: (1) a micro surface having one dimension on the microscale, for example, a surface thickness between 1 μm and 999 μm; (2) a micropillar or microtube having two dimensions on the microscale, for example, a diameter and length each between 1 μm and 999 μm; and/or (3) a microparticle having three dimensions on the microscale, for example, the three spatial dimensions of the nanoparticle being between 1 μm and 999 μm. In one embodiment, the term micropillar further refers to vertically oriented elongate structures, which may be straight, winding, zigzag, or crooked.

The term "touch device," as used herein, refers to a device that can be touched, or a device that is responsive to a touch. Examples of touch devices that are responsive to a touch include, but not limited to, a keypad, touch screen, and/or one or more buttons to allow a user to enter some form of input. Further examples of touch devices comprise, but is not limited to, a writing pen, a hospital bed, a door knob, a light switch, a kitchen surface, a bathroom surface, or a children's toy.

The term "lens," as used herein, refers to any ophthalmic device that resides in or on the eye. These devices may provide optical correction or may be cosmetic. For example, the term lens may refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the lenses are soft contact lenses are made from silicone elastomers or hydrogels, which include but are not limited to silicone hydrogels, and fluorohydrogels. In some embodiments, the lenses are curved.

As described herein, the inventors have created a device comprising one or more non-planar surfaces, wherein the non-planar surfaces comprise one or more microstructures or nanostructures. In some embodiments, the inventors have also created an ophthalmic device comprising a lens, wherein the lens has a curved surface, and wherein the curved surface comprise one or more microstructures or nanostructures.

In various embodiments, described herein is a device, comprising one or more non-planar surfaces, wherein the non-planar surfaces comprise one or more microstructures or nanostructures. In some embodiments, the device is a medical device. In some embodiments, the device is a biomedical device. In some embodiments, the biomedical device comprise artificial cornea, catheter, or stent. In some embodiments, the microstructures or nanostructures are on one surface of the device. In some embodiments, the microstructures or nanostructures are on more than one surface of the device. In some embodiments, the microstructures or nanostructures comprise micropillars or nanopillars. In some embodiments, the micropillars or nanopillars increase or decrease the motility of cells on the device. In some embodiments, the micropillars or nanopillars enable the killing of a microorganism. In some embodiments, the microorganism is a bacterium.

In various embodiments, described herein is a method of manufacturing a device comprising one or more non-planar surfaces, wherein the non-planar surfaces comprise one or more microstructures or nanostructures, comprising the steps: (a) providing a planar master mold with micro or nano features; (b) fabricating an elastomeric replicate mold (elastomeric negative mold) of the master mold; (c) deforming the elastomeric negative mold into the desired curved architecture; and (d) using the curved elastomeric negative mold to mold a micro- or nano-structure on a non-planar surface. In some embodiments, the device is a medical device. In some embodiments, the device is a biomedical device. In some embodiments, the biomedical device comprises artificial cornea, catheter, or stent. In some embodiments, the microstructures or nanostructures are on one surface of the device. In some embodiments, the microstructures or nanostructures are on more than one surface of the device. In some embodiments, the microstructures or nanostructures comprise micropillars or nanopillars. In some embodiments, the micropillars or nanopillars increase or decrease the motility of cells on the device. In some embodiments, the micropillars or nanopillars enable the killing of a microorganism. In some embodiments, the microorganism is a bacterium.

In various embodiments, described herein is a method of using a device comprising one or more non-planar surfaces, wherein the non-planar surfaces comprise one or more microstructures or nanostructures, comprising the steps: (a) using the device for its ordinary purpose; and (b) wherein the microstructures or nanostructures present in the device prevent proliferation of bacteria.

In various embodiments, described herein is a curved or planar surface on a touch device, comprising microstructures or nanostructures. In some embodiments, the surface of the touch device has anti-microbial and/or microbicidal properties. In some embodiments, the touch device is an electronic device with a touch surface. In some embodiments, the touch device is a writing pen, hospital bed, door knob, light switch, kitchen surface, or bathroom surface. In some embodiments, the touch device is a children's toy.

In various embodiments, described herein is a kit comprising a composition for making microstructures and nanostructures as described herein; and wherein the microstructures or nanostructures provide antimicrobial or microbicidal properties.

In various embodiments, described herein is a method of treating a disease, comprising: (a) a device having microstructures or nanostructures; and (b) treating a disease with the device.

In various embodiments, described herein is a treatment regimen, comprising: (a) a device having microstructures or nanostructures; and (b) a treatment regimen that uses the device.

In some embodiments, provided herein is an ophthalmic device comprising a lens, wherein the lens has a curved surface, and wherein the curved surface comprise one or more microstructures or nanostructures.

Figure 2:
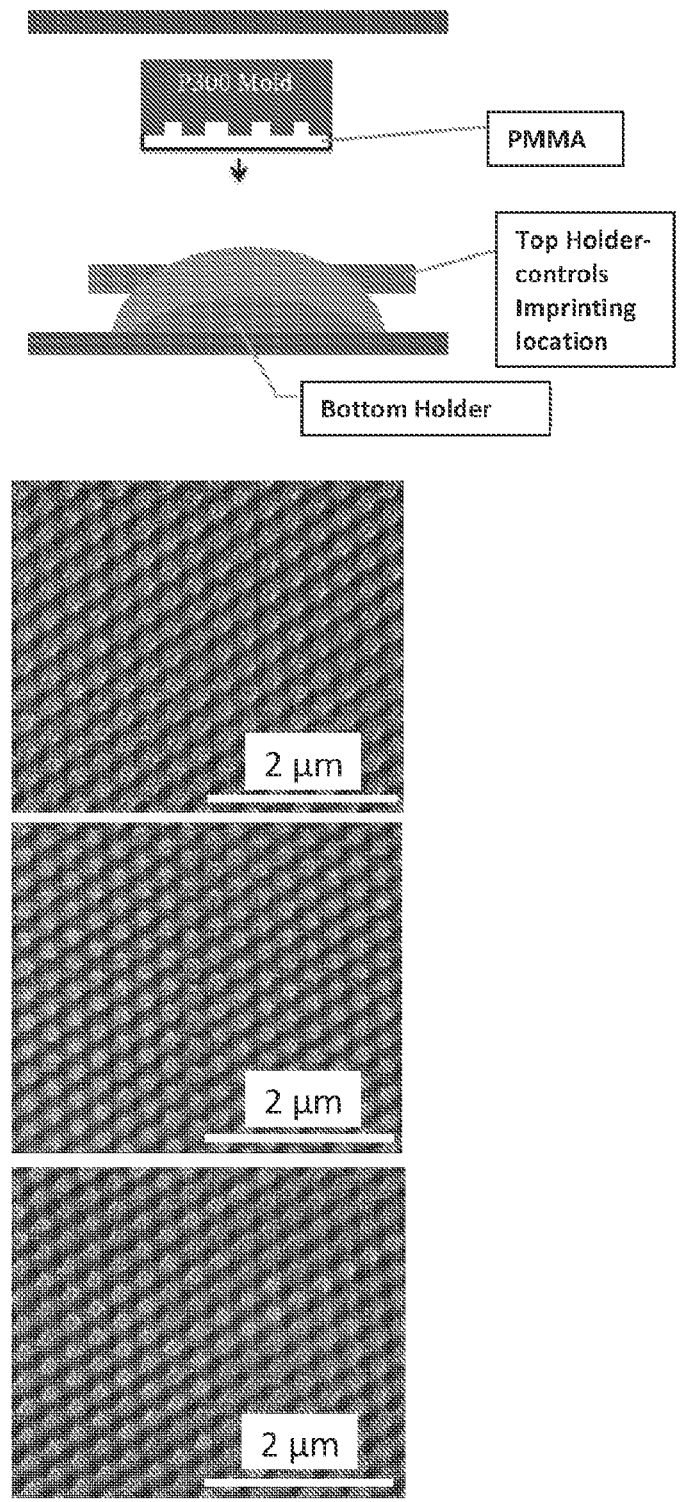
FIG. 2 illustrates, in accordance with embodiments herein, a process of making a curved poly-methylmethacralyte (PMMA) lens with nanostructures.

In some embodiments, provided herein is a method of transferring a microstructured or nanostructured polymer thin film to a curved lens as described in FIG. 2.

In some embodiments, provided herein is a method of transferring a microstructured or nanostructured polymer thin film to a curved lens comprising: (a) providing an elastomeric negative mold with microcavities or nanocavities, wherein the microcavities or nanocavities are the negative of the desired structures; (b) spin-casting a polymer solution onto the elastomeric negative mold, which causes infiltration of the microcavities or nanocavities and creates a residual layer on the elastomer surface; (c) placing a curved piece of polymer inside a holder under heat and pressure; and (d) transferring the microstructures or nanostructures on the residual polymer layer to the curved polymer surface under heat and pressure.

Throughout the disclosure, nanopillars possess a diameter and length each between 1 nm and 999 nm, and they are spaced between 1 nm and 999 nm of each other. Similarly, micropillars possess a diameter and length each between 1 μm and 999 μm, and they are spaced between 1 μm and 999 μm of each other. In one embodiment, Scanning Electron Microscope images of 300 nm periodicity pillars on the curved lens are illustrated in FIG. 2. The pillars were imaged on the top, middle, and bottom of the lens. The pillars appear tilted, indicating the natural curvature of the device.

In various embodiments, disclosed herein is a curved or planar surface on a touch device with microstructure or nanostructure patterns wherein the surface has anti-microbial and/or microbicidal properties. In some of these embodiments, the micro- or nano-patterns control the adhesion of microbes. In one embodiment, the touch device is an electronic device with a touch surface. In one embodiment, the touch device is a writing pen, hospital bed, door knob, light switch, kitchen surface, or bathroom surface etc. In some embodiment, the touch device is a children's toy.

In some embodiments, an elastomeric replicate of the planar mold is fabricated. This flexible elastomeric negative mold is then deformed into the desired, curved architecture. Finally, the curved elastomeric negative molds are used to mold (via polymer hot embossing or monomer polymerization) micro- and nano-structures on non-planar surfaces. In some embodiments, the surfaces include simple lens shapes, similar to a contact lens or a cornea. In other embodiments, the surfaces include complex shapes with several curvatures on multiple surfaces of the same device.

The present disclosure is also directed to a kit for adding a micro-structure or nano-structure coating in devices. The kit is useful for practicing the inventive method of providing the device with antimicrobial and/or microbicidal properties. The kit is an assemblage of materials or components, including at least one of the inventive compositions. Thus, in some embodiments the kit contains a composition comprising one or more elastomeric molds, polymer solution, and holders, as described above.

The exact nature of the components configured in the inventive kit depends on its intended purpose. For example, some embodiments are configured for the purpose of providing microbicidal and antimicrobial properties in medical devices. In one embodiment, the kit is configured particularly for the purpose of providing a nanostructure coating in touch devices. In another embodiment, the kit is configured for the purposes of treating mammalian subjects. In another embodiment, the kit is configured particularly for the purpose of treating human subjects. In further embodiments, the kit is configured for veterinary applications, treating subjects such as, but not limited to, farm animals, domestic animals, and laboratory animals.

Instructions for use may be included in the kit. "Instructions for use" typically include a tangible expression describing the technique to be employed in using the components of the kit to effect a desired outcome, such as to provide microstructures or nanostructures on devices. Optionally, the kit also contains other useful components, such as, diluents, buffers, pharmaceutically acceptable carriers, syringes, catheters, applicators, pipetting or measuring tools, bandaging materials or other useful paraphernalia as will be readily recognized by those of skill in the art.

The materials or components assembled in the kit can be provided to the practitioner stored in any convenient and suitable ways that preserve their operability and utility. For example the components can be in dissolved, dehydrated, or lyophilized form; they can be provided at room, refrigerated or frozen temperatures. The components are typically contained in suitable packaging material(s). As employed herein, the phrase "packaging material" refers to one or more physical structures used to house the contents of the kit, such as inventive compositions and the like. The packaging material is constructed by well-known methods, preferably to provide a sterile, contaminant-free environment. The packaging materials employed in the kit are those customarily utilized in the medical device industry and/or in the polymer industry. As used herein, the term "package" refers to a suitable solid matrix or material such as glass, plastic, paper, foil, and the like, capable of holding the individual kit components. Thus, for example, a package can be a glass vial used to contain suitable quantities of the presently disclosed inventive composition. The packaging material generally has an external label which indicates the contents and/or purpose of the kit and/or its components.

The method described herein is uniquely able to apply precisely defined (by the arbitrary, planar master mold) nano- or micro-structures to a variety of biomedical device materials on complex curved topographies.

Embodiments of the present disclosure are further described in the following examples. The examples are merely illustrative and do not in any way limit the scope of the invention as claimed.

EXAMPLES

Example 1

Method of Making a Curved Patterned Surface

FIG. 1 illustrates one embodiment of the process of making a curved nano-structured polymer surface. In this embodiment, to make a curved patterned surface, the pattern is replicated onto a planar elastomer mold with soft lithography. Elastomers include silicone and polyurethane elastomers. A polymer precursor solution is applied into the curved elastomer mold. This results in a curved nanostructured polymer surface.

Referring to FIG. 1, in step 1, a hard mold (i) with nano-pillars with 300 nm periodicity was provided. The pillars were 190 nm in diameter and 300 nm in height. High modulus polydimethyl siloxane (hPDMS) was pipetted onto (i) and left at room temperature for 1.5 hours then cured at 65° C. for 0.5 hour. After the hPDMS was cured, polydimethyl siloxane (PDMS) prepolymer was poured on top and cured at 80° C. for one hour. After PDMS was cured, the planar silicone mold (ii) was demolded.

In step 2 of FIG. 1, PDMS was poured in glass container (iii) and cured at 80° C. for one hour. The PDMS sheet (iv) was then peeled off from the glass container (iii). In step 3, the silicone mold (ii) and the PDMS sheet (iv) were coated with perfluorodecyltrichlorosilane (FDTS) using Molecular Vapor Deposition (MVD) to form (v) and (vi). The MVD process formed a uniform thin film of FDTS on the substrate by depositing molecules at low temperature. The FDTS monolayer reduces surface energy. FDTS is an anti-sticking precursor used to prevent adhesion between coated items with another material.

In step 4 of FIG. 1, PDMS solution was pipetted into a smaller glass container (vii). The FDTS coated PDMS sheet (vi) was pressed into the PDMS solution in the glass container (vii) with a tool (viii), with the FDTS coated side contacting PDMS, to produce a concave surface. The tool used in this procedure had a diameter of 1.5 cm with a radius of curvature of 0.69 cm. It was then cured at 80° C. for one hour and afterwards demolded. (ix) was made to be the holder for transferring the pattern and also for controlling the surface contour.

In step 5 of FIG. 1, hPDMS was pipetted into (ix). (v) was pressed with the tool (viii) and left at room temperature for 1.5 hour for the hPDMS to fill the features, then cured at 65° C. for 0.5 hour. The pattern was transferred onto the concave surface after cooling and demolded. (x) was the non-planar silicone mold.

In step 6 of FIG. 1, poly-methylmethacralyte (PMMA) solution was pipetted into (x) and placed under vacuum to remove air bubbles. After the toluene had evaporated, the PMMA lens (xii) was peeled off from (xi). Using photopolymerization to form a cross-linked PMMA lens helped in controlling the durability and thickness of the device. Finally, in step 7, (viii) was used to press (v) onto (xi). The lens (xiii) had nano-patterns on both sides after the solvent had evaporated.

Example 2

Curved PMMA Lens

FIG. 2 illustrates one embodiment of the disclosure, describing a schematic of the process for making a curved poly-methylmethacralyte (PMMA) lens with nanostructures. In this embodiment, the inventors created a method for transferring a nanostructured polymer thin film to a curved polymer surface.

An elastomeric mold with the nano sized cavities, the negative of the desired structures, was fabricated (P300 Mold). Then the polymer solution was spin-cast onto the elastomeric negative mold such that it infiltrates the nano sized cavities and creates a residual layer on the elastomer surface. In this example, 5% (by weight) PMMA in toluene was used as the polymer solution. Finally, a curved piece of the same polymer was placed inside a holder and under heat and pressure. This process conformed the elastomer mold to the curved polymer piece. In some embodiments, if the temperature is at or above the glass transition temperature of the polymer, wetting might occur between the residual polymer layer and the curved polymer surface. In these embodiments, the nanostructured coating is transferred to the curved polymer piece.

The holder is fabricated from a rigid, heat conducting material. Aluminum was used in this example. This rigid holder transferred the force and pressure from the flat plates of the thermal press to the curved polymer piece, and controlled the spatial location to which the structures were transferred.

FIG. 2 also illustrates, in one embodiment, a photograph of a curved PMMA lens with nanostructures in the central region, manufactured using the approach described above. The nanostructures diminish light reflection, causing the anti-glare effect visualized in the central region.

Scanning Electron Microscope images of 300 nm periodicity pillars on the curved lens is illustrated in FIG. 2. The pillars were imaged on the top, middle, and bottom of the lens. The pillars appear tilted, indicating the natural curvature of the device.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art. Among these variations, without limitation, are the selection of constituent modules for the inventive compositions, and the diseases and other clinical conditions that may be diagnosed, prognosed or treated therewith. Various embodiments of the invention can specifically include or exclude any of these variations or elements.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a," "an," and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

What is claimed is:

1. A method of micro and nanoimprint transfer lithography on a curved polymeric substrate, comprising:
providing a polymeric substrate having a surface characterized by a radius of curvature;
providing a polymeric film having a first surface and a second surface, wherein the first surface comprises a plurality of micro or nanostructures; and
pressing the second surface of the polymeric film against the surface of the polymeric substrate and conforming the polymeric film to the curvature of the surface of the polymeric substrate at or above a polymeric glass transition temperature, such that wetting and transferring occurs between the second surface of the polymeric film and the surface of the polymeric substrate without any melting damage to the plurality of micro or nanostructures of the first surface of the polymeric film;
to produce a curved substrate comprising a micro or nanostructured pattern on its surface.

2. The method of claim 1, wherein the polymeric substrate is a component of a biomedical device.

3. The method of claim 2, wherein the biomedical device comprises a device selected from the group consisting of: an artificial cornea, a catheter, and a stent.

4. The method of claim 2, wherein the biomedical device is an ophthalmic device and the substrate is a lens.

5. The method of claim 1, wherein the plurality of micro or nanostructures comprises a plurality of micro or nanopillars respectively.

6. The method of claim 5, wherein the plurality of micro or nanopillars increases or decreases the motility of cells on contact.

7. The method of claim 5, wherein the plurality of micro or nanopillars prevents proliferation of a microorganism.

8. The method of claim 7, wherein the microorganism is a bacterium.

9. The method of claim 1, wherein the polymeric substrate and the polymeric film comprise the same polymeric material.

* * * * *